US008960763B2

(12) United States Patent
Fisher et al.

(10) Patent No.: US 8,960,763 B2
(45) Date of Patent: Feb. 24, 2015

(54) RETRACTABLE SUN VISOR AND CENTRAL OVERHEAD CONSOLE SYSTEM FOR USE WITH PANORAMIC WINDSCREEN

(71) Applicant: Tata Technologies Pte Ltd, Singapore (SG)

(72) Inventors: Kevin Fisher, Novi, MI (US); Jeff Beggs, Nov, MI (US); Anthony Jones, Novi, MI (US); Nigel Giddons, Novi, MI (US); Adam Leece, Novi, MI (US)

(73) Assignee: Tata Technologies Pte Limited, Singapore (SG)

( * ) Notice: Subject to any disclaimer, the term of this patent is extended or adjusted under 35 U.S.C. 154(b) by 0 days.

(21) Appl. No.: 13/743,615

(22) Filed: Jan. 17, 2013

(65) Prior Publication Data

US 2013/0187402 A1 Jul. 25, 2013

(30) Foreign Application Priority Data

Jan. 17, 2012 (IN) .......................... 157/MUM/2012

(51) Int. Cl.
*B60J 3/02* (2006.01)
*B60J 7/00* (2006.01)
(52) U.S. Cl.
CPC .............. *B60J 3/0204* (2013.01); *B60J 3/0213* (2013.01); *B60J 7/0015* (2013.01); *B60J 7/0007* (2013.01)
USPC ........................................ 296/97.8; 296/215

(58) Field of Classification Search
USPC ......... 296/140, 152, 193.12, 200, 215, 96.12, 296/96.19, 97.1, 97.5, 97.6, 97.7, 97.8, 296/97.9, 97.11
See application file for complete search history.

(56) References Cited

U.S. PATENT DOCUMENTS

| 4,674,789 | A | * | 6/1987 | Watjer et al. ................. 296/97.1 |
| 5,331,525 | A | * | 7/1994 | Lawassani et al. ........... 362/140 |
| 5,947,544 | A | | 9/1999 | Hubeshi |
| 6,227,601 | B1 | * | 5/2001 | LaFrance ..................... 296/97.4 |
| 6,979,042 | B2 | * | 12/2005 | Kawasaki .................... 296/97.8 |
| 7,216,917 | B2 | * | 5/2007 | Tadakamalla ............... 296/97.4 |
| 7,252,321 | B2 | * | 8/2007 | Lee .............................. 296/97.4 |
| 7,306,276 | B2 | * | 12/2007 | Berberich et al. .......... 296/24.34 |
| 7,802,836 | B2 | * | 9/2010 | Baudouin .................... 296/97.1 |
| 2004/0160082 | A1 | * | 8/2004 | Bohm et al. ............... 296/97.11 |

FOREIGN PATENT DOCUMENTS

| DE | 102005028612 A1 | 1/2007 |
| FR | 2873328 A1 | 1/2006 |
| JP | 2002331833 A | 11/2002 |

* cited by examiner

*Primary Examiner* — Jason S Morrow
*Assistant Examiner* — E Turner Hicks
(74) *Attorney, Agent, or Firm* — Merchant & Gould P.C.

(57) ABSTRACT

The present invention provides an assembly for controllable viewing angle for a vehicle. The system further provides configurable independent sunlight blocking or completely unobstructed options for the occupants in the vehicle having a panoramic view windscreen.

6 Claims, 9 Drawing Sheets

RETRACTABLE SUN VISOR AND CENTRAL OVERHEAD CONSOLE SYSTEM FOR USE WITH PANORAMIC WINDSCREEN

This application is claims benefit of Serial No. 157/MUM/2012, filed 17 Jan. 2012 in India and which application is incorporated herein by reference. To the extent appropriate, a claim of priority is made to the above disclosed application.

FIELD OF THE INVENTION

The present invention relates to a sun visor, more particularly the present invention relates to a sun visor system for occupant of a vehicle, allowing for a panoramic windscreen.

BACKGROUND OF THE INVENTION

In an automobile, sun visors are provided to shield driver and passenger from direct sunlight under conditions when the sun is at the horizon. Such conditions can compromise the driver's ability to discern objects in front of the car and will constitute a hazardous situation.

Hence, to shield the driver and passenger's vision path, the position of the sun visor is constrained to a band that is dictated by ergonomics. The visor is typically affixed at the point where the roof and front windscreen join and thus constraints position, size and placement of the sun visor.

In vehicle design, it would be desirable to extend the top of the windscreen above the driver and passenger heads to allow for a "panoramic" windscreen that would have the following advantages:
  a) It would be unique and set the vehicle apart from competitors allowing for differentiated marketing.
  b) Under certain driving conditions, the driver and passenger would experience a feeling of openness and additional visibility.
  c) By having a larger windscreen, overall vehicle weight would be reduced.
  d) It confers greater flexibility in vehicle styling.
  e) The viewing angle for a driver would increase.

However, as mentioned above, the roof and windscreen top, constrain the position of the sun visor. Another limitation of the "panoramic" windscreen is it potentially allows direct sunlight to impinge the vehicle cabin. This has adverse effect on the occupants, and cabin heating/cooling, which therefore needs to be addressed.

Thus, there is need in the art that overcomes these constraints or limitation by allowing the sun visor to be mounted directly to the windscreen and a sunshade that can be pulled into place and then retracted as and when needed.

OBJECTS OF THE INVENTION

The principal object of the present invention is to provide a system adapted to provide sun visor protection to the occupant the vehicle while allowing for a panoramic windscreen that curves into the roof.

Another object of the present invention is to provide a system that will allow for enhancing aerodynamics of a vehicle without reducing occupant comfort.

Another object of the present invention is to provide a system that enables an occupant of a vehicle to control viewing angle for the occupants of the vehicle.

Another object of the invention is to provide a system comprising a centre pod fixed in the centre of the glass and adapted to configure the sun visor. The pod further comprises an interior light.

Yet another object of the invention is to provide a system wherein the sun screen and sun shade do not interfere with the upward visibility line of 14 degree from the horizon.

Another object of the invention is to provide a system comprising the sunscreen adapted to fully deploy along with the sun visors forming complete sun block with no leakage.

Another object of the invention is to provide a system for blocking direct sunlight from the occupants of a vehicle and allowing controllable viewing angle therefrom the vehicle to each passenger.

Another object of the invention is to provide a system further provides configurable independent sunlight blocking or completely unobstructed options for the occupants in a vehicle with a panoramic view windscreen.

Another object of the invention is to provide a sun visor adapted to deploy by a combination of two movements:
  a) a rotation through 90 degrees in a plane parallel to the roof of the car;
  b) a rotation through 90 degrees around an axis that runs parallel to the roof but across the car.

SUMMARY OF THE INVENTION

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and together with the description serve to explain the principles and operation of the invention.

The present invention relates to a system for controllable viewing angle and independent sunshade provision there from the vehicle to each passenger of a vehicle equipped with a panoramic windscreen, the system comprising of a windscreen extending from a base of a hood up to a predetermined length of a roof, the said continuous windscreen comprising a curved radial surfaces adapted to offer negligent kinematic obstruction to the vehicle assembly and lateral edges thereof supported with a pair of angulated post inclined in a first plane; a sun visor disposed on a pod wherein the pod is glued on the inner wall of the windscreen; a plurality of track, laid parallel to each other are deployed on an inner wall of the windscreen; and a retractable sunshade located on the plurality of track.

In another aspect of the invention, a system is provided which is adapted to enable a standard sun visor to allow for panoramic windscreen when retracted by the occupants of the vehicle.

Yet another aspect of the invention is to provide the sun visor adapted to deploy by a combination of two movements:
  a) a rotation through 90 degrees in a plane parallel to the roof of the vehicle; and
  b) a rotation through 90 degrees around an axis that runs parallel to the roof but across the vehicle.

BRIEF DESCRIPTION OF DRAWINGS

The above-mentioned and other features and advantages of the various embodiments of the invention, and the manner of attaining them, will become more apparent and will be better understood by reference to the accompanying drawings, wherein.

DETAILED DESCRIPTION OF THE INVENTION

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

It must also be noted that as used herein and in the appended claims, the singular forms "a," "an," and "the" include plural references unless the context clearly dictates otherwise. Although any apparatus, methods, apparatuses, and devices similar or equivalent to those described herein can be used in the practice or testing of embodiments of the present invention, the preferred, apparatus and parts are now described. The disclosed embodiments are merely exemplary of the invention, which may be embodied in various forms.

The disclosed embodiment "a windscreen" is similar or equivalent to "a windshield" in the vehicle.

In the disclosed embodiment "a system" is similar or equivalent to "an assembly" of the invention.

The present invention provides a system for controllable viewing angle and independent sunshade provision there from the vehicle to each passenger of a vehicle equipped with a panoramic windscreen, the system comprising of a windscreen extending from a base of a hood up to a predetermined length of a roof, the said continuous windscreen comprising a curved radial surfaces adapted to offer negligent kinematic obstruction to the vehicle assembly and lateral edges thereof supported with a pair of angulated post inclined in a first plane; a sun visor disposed on a pod wherein the pod is glued on the inner wall of the windscreen; a plurality of track, laid parallely are deployed on an inner wall of the windscreen; and a retractable sunshade located on the plurality of track.

Figure 1:
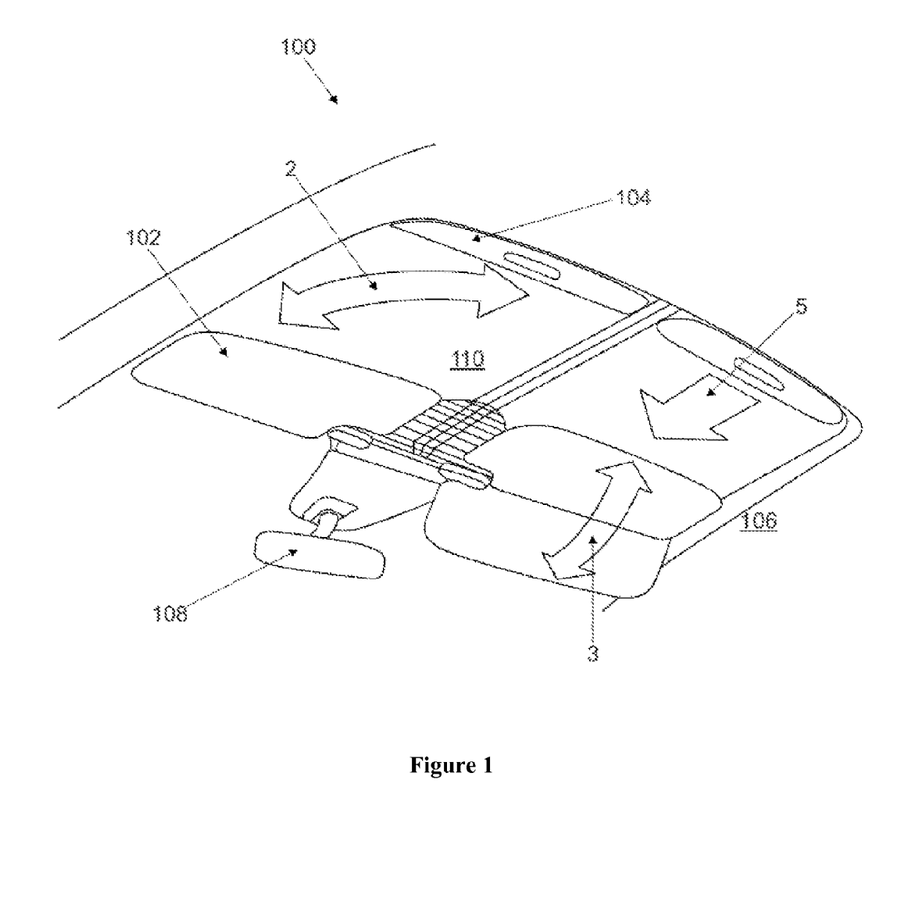
FIG. 1 illustrates the retractable sun visor and center console according to one embodiment of the invention.

FIG. 1 illustrates the retractable sun visor and center console according to one embodiment of the invention.

Referring to FIG. 1 illustrates a system (100) for controllable viewing angle and independent sunshade provision thereof a vehicle to each passenger of the vehicle equipped with a panoramic windscreen comprises, a sun visor module and sun shade module. The sun shade module consists of a sun shade (104). The sun visor module consists of a sun visor (102). The sun visor (102) is deployed by a combination of two movements i.e. a rotation through 90 degree in a plane parallel to the roof of the car; and a rotation through 90 degree around an axis that runs parallel to the roof but across the car.

According to one embodiment of the invention the system (100) is adapted for enabling independent sunlight blocking or completely unobstructed options for the occupants in a vehicle with a panoramic view windscreen.

According to another embodiment of the invention the system (100) integrates the sun visor (102) and the sun shade (104) to provide a complete screening mechanism.

According to an embodiment of the invention, a continuous windscreen extends from a base of a hood up to a predetermined length of a roof; the continuous windscreen comprises a curved radial surface adapted to offer negligent kinematic obstruction to the vehicle assembly and lateral edges thereof supported with a pair of angulated post inclined in a first plane. In a preferred embodiment of the invention, the windscreen is supported continuously by its edges to the vehicle structure by use of an adhesive.

In another embodiment of the invention, the sun visor (102) is adapted for a motion in a direction as referred by 2 and 3 in FIG. 1. The sun visor (102) is deployed by at least one movement i.e. a rotation through 90 degree in a plane parallel to the roof of the car and/or a rotation through 90 degree around an axis that runs parallel to the roof but across the car.

Further, the sun shade (104) is adapted for a motion as illustrated reference 5 in FIG. 1. The sun shade (104) is adapted to retract and deploy motion. The retractable sunshade (104) is attached to a spring loaded roller at the base of a plurality of tracks (106) for providing a means to the sunshade (104) for retraction when the shade (104) is dislodged from its predetermined locking positions on the plurality of the tracks (106). The plurality of the tracks (106) are laid parallel to each other on an inner side to the windscreen. According to preferred embodiment of the invention the sun shade (104) is manufactured from the injection molded plastic.

The sun visor (102) is further mounted on a pod (110) that is glued to the glass in the centre of the windscreen. The pod (110) further comprises an interior light.

In another embodiment of the invention, the assembly further comprises a plurality of tracks (106) adapted for deploying and retracting the sunshade (104) manually by the driver or passenger. According to preferred embodiment the plurality of tracks (106) is manufactured from self-lubricating high-density polyethylene (HDPE). The plurality of tracks (106) are used in four track system.

In another embodiment of the invention, the sunshade (104) is built into the roof of the car with a separate external frame to ensure dimensional accuracy and reliable operation. The sunshade (104) is adapted to cover the side window. The sunshade (104) can be stored in a centre line position to give full access to panoramic view.

The system (100) further comprises a rear view mirror (108) mounted on the inner face of the windscreen. The rear view mirror (108) is mounted on to the windshield with suitable adhesive.

Figure 2:
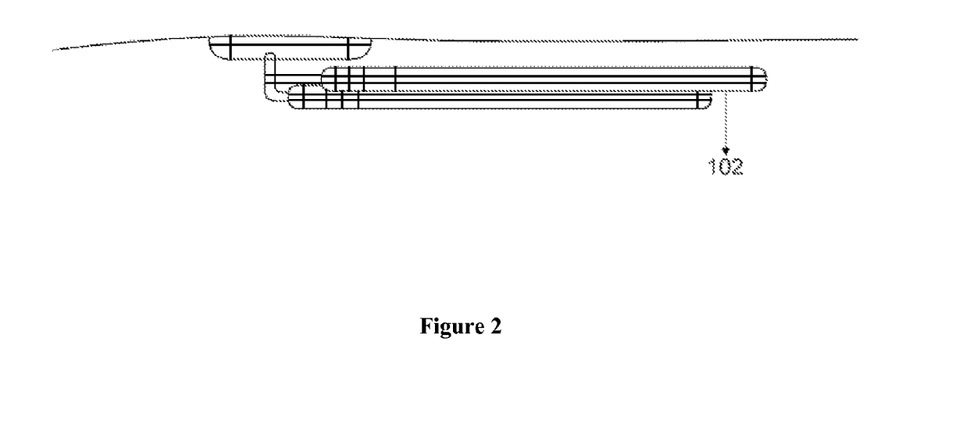
FIG. 2 illustrates side elevation of the sun visor in retracted position from side of car according to one embodiment of the invention.

FIG. 2 illustrates side elevation of the sun visor in retracted position from a first side of car.

In another embodiment of the invention the sun visor (102) is deployed by combination of two movements firstly a rotation through 90 degree in plane, secondly a rotation through 90 degree around an axis that run parallel to the roof across the car.

In preferred embodiment of the invention the sun visor (102) is manufactured from suitable fabric with foam core. The suitable fabric and foam core enable to reduce weight.

Figure 3:
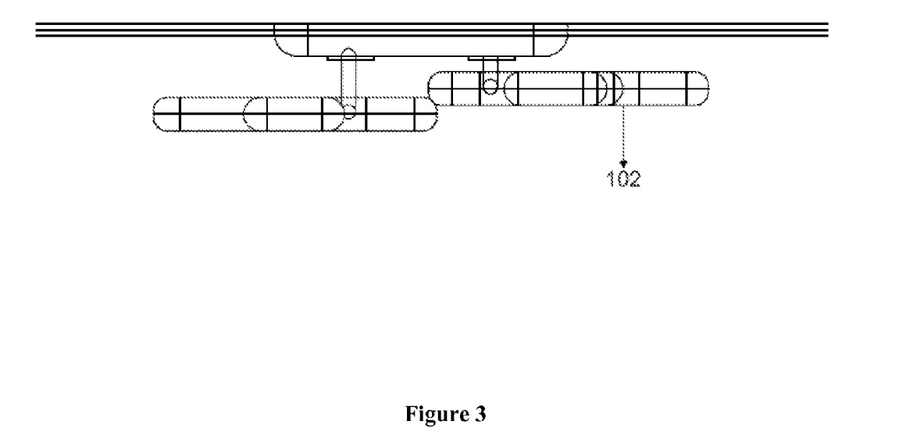
FIG. 3 illustrates end elevation of the sun visor in retracted position from rear of car according to one embodiment of the invention.

FIG. 3 illustrates end elevation of the sun visor (102) in retracted position from rear of car according to one embodiment of the invention.

Figure 4:
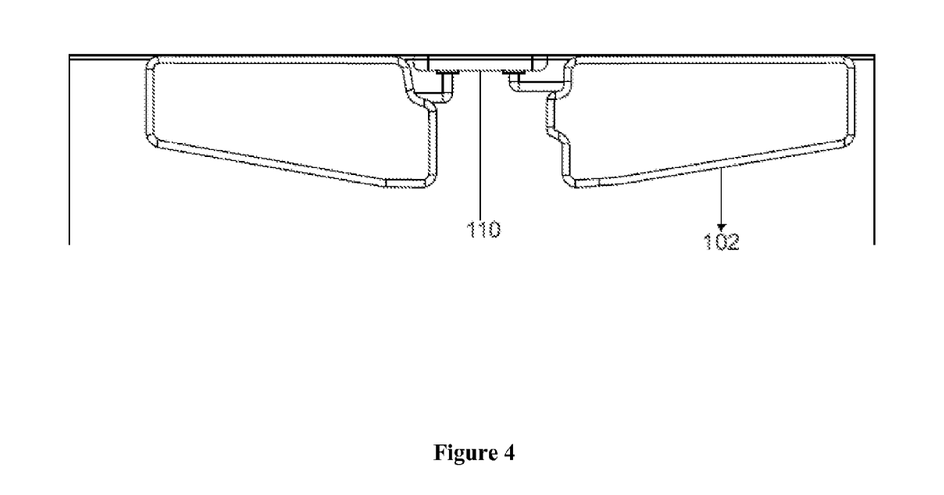
FIG. 4 illustrates end elevation of the sun visor in extended position from rear of car according to one embodiment of the invention.

FIG. 4 illustrates end elevation of the sun visor (102) and position of the pod (110) in extended position from rear of car according to one embodiment of the invention.

Figure 5:
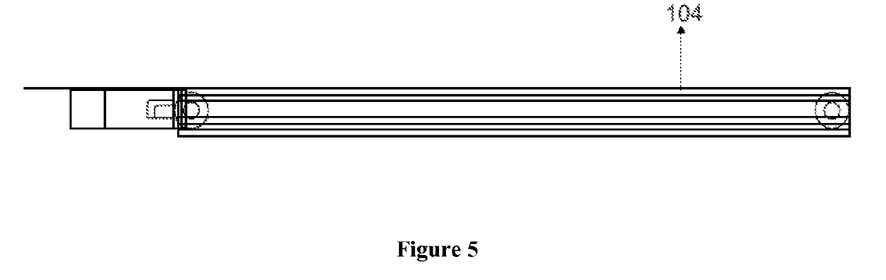
FIG. 5 illustrates side elevation of the sunshade from side of car according to one embodiment of the invention.

FIG. 5 illustrates side elevation of the sunshade (104) from another side of a car according to one embodiment of the invention.

Figure 8:
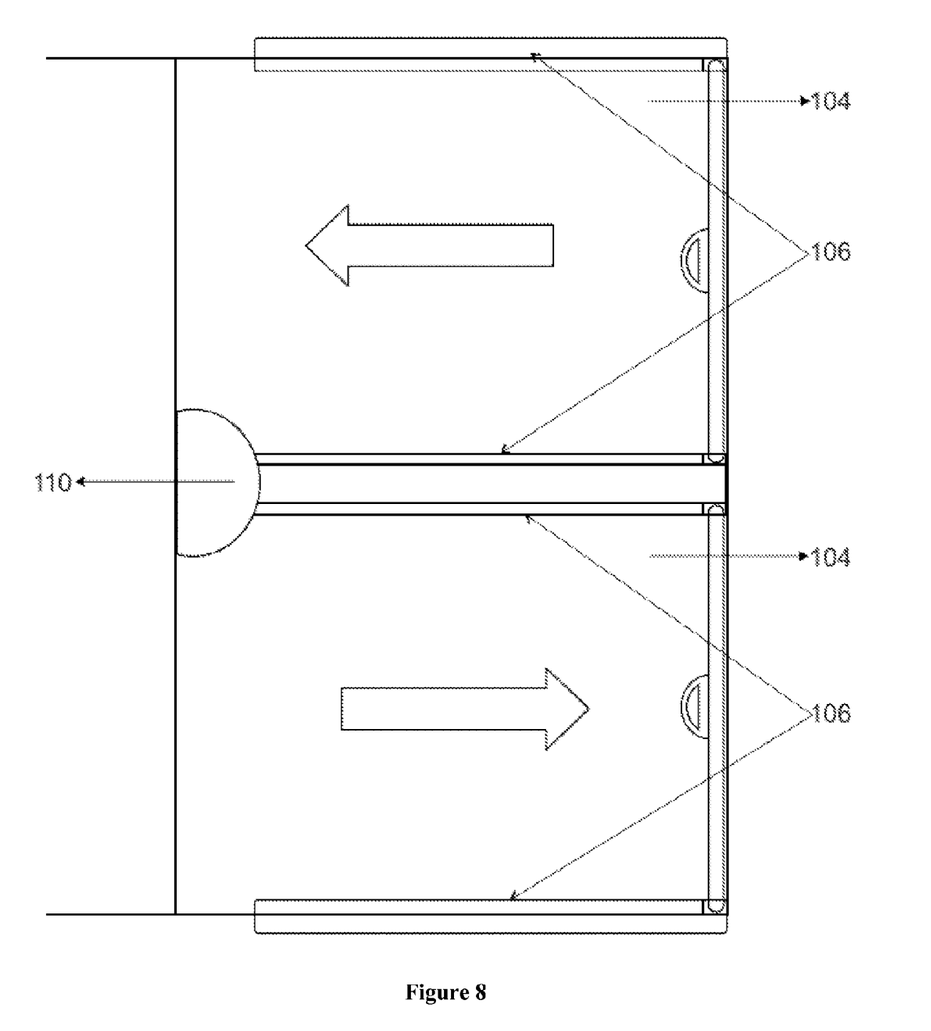
FIG. 8 illustrates a track provided on either side of the shade for enabling deploy and retract manually according to one embodiment of the invention.

In another embodiment of the invention the sunshade (104) is adapted to deploy or retract on a plurality tracks (106) according to the occupant's need in the vehicle via wire-pulley system to keep pull bar parallel. The plurality of tracks (106) are provided on the either side of the sunshade (104) to ensure that it moves accurately with small resistance and is not prone to jamming as shown in FIG. 8.

In another embodiment of the invention the retractable sunshade (104) is attached to a spring loaded roller at the base of the track for enabling a means for retraction of sunshade (104) when the sunshade (104) is dislodged from its predetermined locking positions on the plurality of the track (106).

According to another embodiment of the invention the sunscreen and the sunshades (104) do not interfere with the upward visibility line of 14 degree from the horizon. The sunscreen adapted to deploy along with the sun visor (102) will form complete sun block with no leakage. In a preferred embodiment the retractable sunshade (104) is manufactured from injection molded plastic.

According to another embodiment of the invention the sunshade (104) contained in standalone module making it independent of dimensionally accuracy of surrounding BIW (Body in white).

Figure 6:
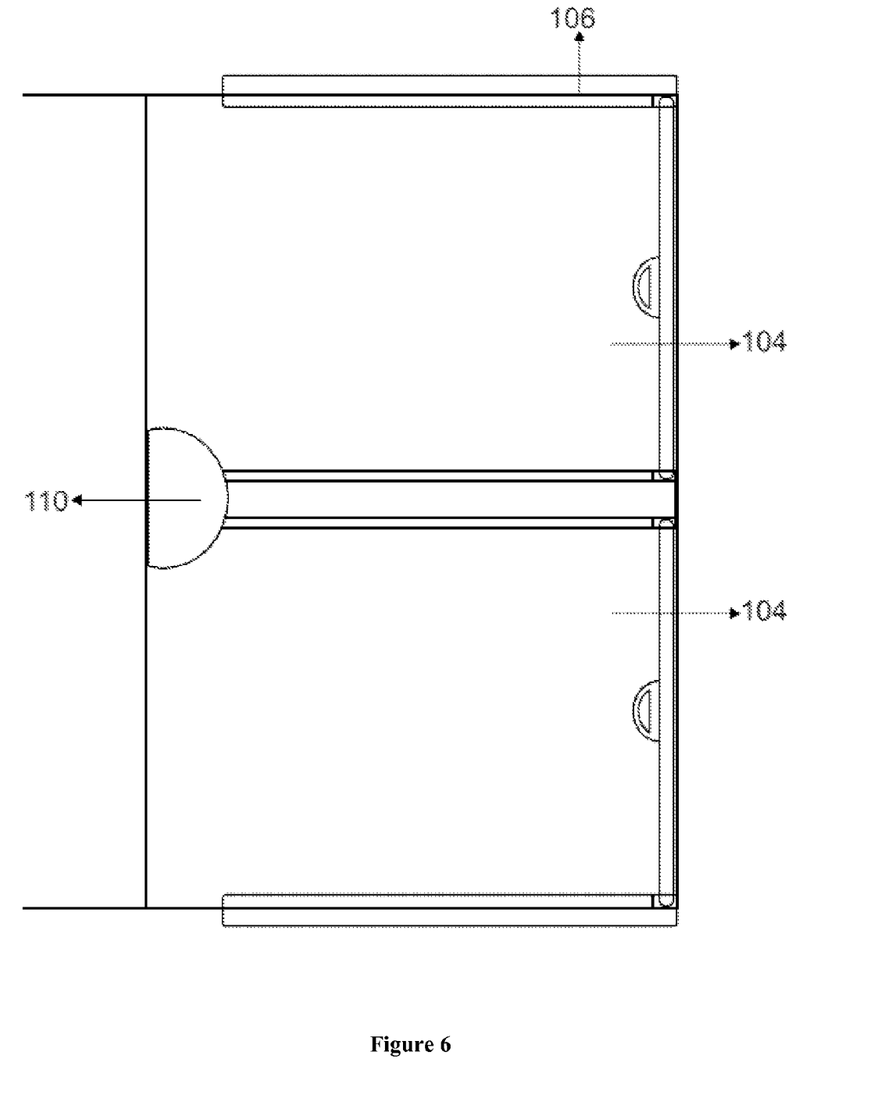
FIG. 6 illustrates plan elevation of sunshade with shade in retracted position from top of car according to one embodiment of the invention.

FIG. 6 illustrates plan elevation of sunshade with shade in retracted position from top view of a car according to one embodiment of the invention.

Figure 7:
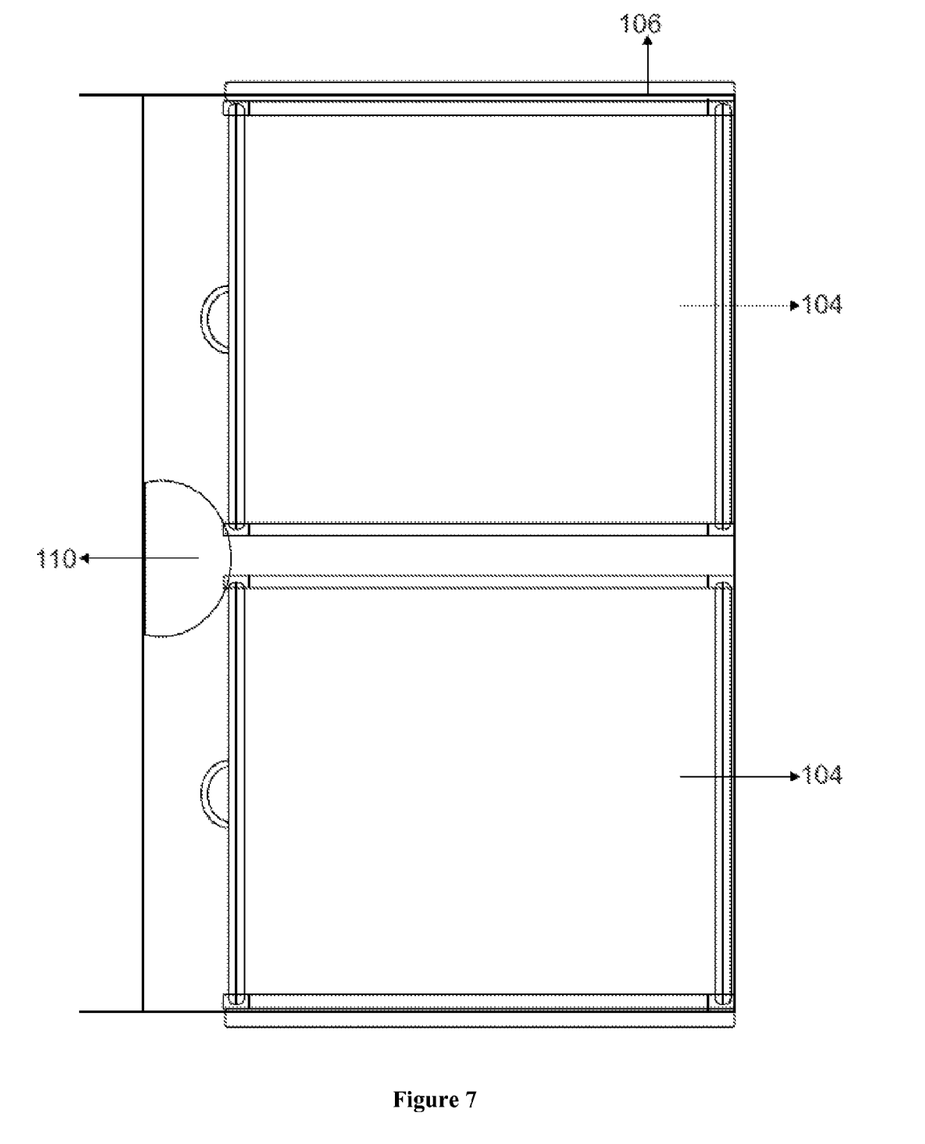
FIG. 7 illustrates plan elevation of sunshade with shade in deployed position from top of car according to one embodiment of the invention.

FIG. 7 illustrates plan elevation of sunshade with shade in deployed position from top view of car according to one embodiment of the invention.

FIG. 8 illustrates a track provided on either side of the shade for enabling deploy and retract manually according to one embodiment of the invention.

Figure 9:
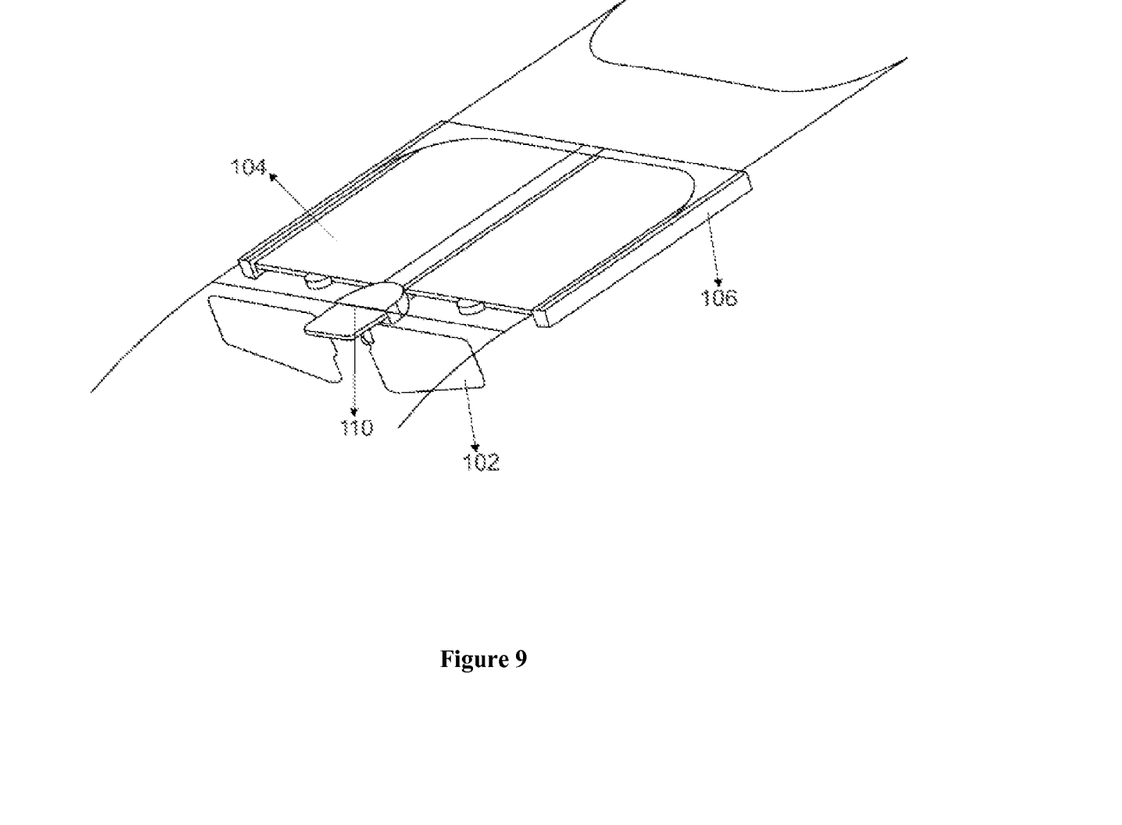
FIG. 9 illustrates an isometric view of the sun visor and sunshade system fully assembled below the windscreen.

FIG. 9 illustrates an isometric view of the sun visor and sunshade system fully assembled below the windscreen.

Referring to FIG. 9 illustrates the system (100) comprising the pair of the sun visor (102), the sun shade (104), the track (106), and the pod (110).

Referring to FIG. 9 the sun visor (102) is deployed by a combination of two movements i.e. a rotation through 90 degree in a plane parallel to the roof of the car; and a rotation through 90 degree around an axis that runs parallel to the roof but across the car. The sun visor (102) is manufactured from suitable fabric with foam core enabling the light weight of the sun visor.

Referring to FIG. 9 the retractable sunshade (104) is attached to a spring loaded roller at the base of the track (106) for enabling a means for the sunshade (104) to retract when the shade (104) is dislodged from its predetermined locking positions on the plurality of tracks (106). According to preferred embodiment of the invention the sun shade (104) is manufactured from the injection molded plastic.

Referring to FIG. 9 the track (106) adapted for deploying and retracting the sunshade (104) manually by the driver or passenger. According to preferred embodiment of the invention the track (106) is manufactured from self-lubricating high-density polyethylene (HDPE). In preferred embodiment of the invention the track (106) system used is four track systems.

Referring to FIG. 9 the sun visor (102) is mounted on a pod (110) that is glued to the glass in the centre of the windscreen. The pod (110) further includes an interior light.

Physical Variables and their Operating Ranges
1. Sun Visor dimensions approx. 380 mm (1) by 170 mm (w) by 12 mm (thickness).
2. Sunshade dimension approx. 550 mm by 560 mm.
3. Sun Visor capable of the operating range (rotation about two axes) specified earlier.
4. Sunshade capable of at least 400 mm of travel.

Advantages of the Invention a) The system will provide a unique and set the vehicle apart from competitors allowing for differentiated marketing.
b) The driver and passenger would experience a feeling of openness and additional visibility.
c) By having a larger wind screen, overall vehicle weight should be reduced.
d) It confers greater flexibility in vehicle styling.

We claim:

1. An assembly for controlling viewing angle for at least one occupant in a vehicle, the assembly comprising:
a panoramic windscreen extending from a base of a front hood of the vehicle to a predetermined length of a roof of the vehicle;
retractable sunshades mounted on the panoramic windscreen, wherein the retractable sunshades are adapted to cover the panoramic windscreen;
a plurality of tracks, mounted on an inner wall of a portion of the panoramic windscreen extending to the predetermined length of the roof of the vehicle, running parallel to one another; wherein the plurality of tracks comprise a wire-pulley system at its base for allowing the retractable sunshades to move and retract within the plurality of tracks, and wherein the plurality of tracks are made up of self-lubricating high-density polyethylene (HDPE); and
a pair of sun visors disposed on a pod, wherein the pod is fixed on the inner wall of the panoramic windscreen, wherein the pair of sun visors is adapted to deploy in two movements, wherein a first movement is a rotation of 90 degrees in a plane parallel to the roof of the vehicle, and wherein a second movement is a rotation of 90 degrees around an axis parallel to the roof and across the vehicle.

2. The assembly according to claim 1, wherein the retractable sunshades are attached to a spring loaded roller in the base of the track for providing a means to retract the retractable sunshades when dislodged from a predetermined locking positions on the plurality of tracks.

3. The assembly according to claim 1, wherein the panoramic windscreen is supported continuously by its edges to the vehicle structure by use of an adhesive and a pair of angulated post.

4. The assembly according to claim 1, further comprises a rear view mirror mounted on the inner face of the panoramic windscreen.

5. The assembly according to claim 1, wherein the retractable sunshades are manufactured from injection molded plastic.

6. The assembly according to claim 1, wherein the pair of sun visors is manufactured from suitable fabric with foam core.

\* \* \* \* \*